(12) United States Patent
Dhuse et al.

(10) Patent No.: US 12,468,683 B2
(45) Date of Patent: *Nov. 11, 2025

(54) VERIFYING SLICE MIGRATION IN A STORAGE NETWORK

(71) Applicant: Pure Storage, Inc., Santa Clara, CA (US)

(72) Inventors: Greg R. Dhuse, Chicago, IL (US); Jason K. Resch, Warwick, RI (US)

(73) Assignee: Pure Storage, Inc., Santa Clara, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/596,914

(22) Filed: Mar. 6, 2024

(65) Prior Publication Data

US 2024/0211465 A1    Jun. 27, 2024

Related U.S. Application Data

(63) Continuation of application No. 17/644,277, filed on Dec. 14, 2021, now Pat. No. 11,934,380, which is a
(Continued)

(51) Int. Cl.
*G06F 16/00* (2019.01)
*G06F 3/06* (2006.01)
(Continued)

(52) U.S. Cl.
CPC ............ *G06F 16/2365* (2019.01); *G06F 3/06* (2013.01); *G06F 3/0619* (2013.01);
(Continued)

(58) Field of Classification Search
CPC ............ G06F 16/2365; G06F 16/1844; G06F 16/2255; G06F 16/119; G06F 16/137;
(Continued)

(56) References Cited

U.S. PATENT DOCUMENTS

| 4,092,732 A | 5/1978 | Ouchi |
| 5,454,101 A | 9/1995 | Mackay |

(Continued)

FOREIGN PATENT DOCUMENTS

| GB | 2401006 | 10/2004 |
| WO | WO0113572 A1 | 2/2001 |

(Continued)

OTHER PUBLICATIONS

K.H. Rahouma, "Utilization of multiple block cipher hashing in authentication and digital signatures", Proceedings IEEE International Conference on Networks 2000 (ICON 2000). Networking Trends and Challenges in the New Millennium, Sep. 2000, pp. 257-261.*

(Continued)

*Primary Examiner* — Srirama Channavajjala
(74) *Attorney, Agent, or Firm* — Katz Ruby & Carle LLP; Katherine C. Stuckman; Bruce E. Stuckman

(57) ABSTRACT

A storage network operates by: sending a slice verification request to a destination storage unit, wherein the slice verification request includes a nonce and one or more of: a slice identifier, the slice, a revision indicator, or a verification method indicator; receiving an integrity value from the destination storage unit; determining when the integrity value is verified by determining one of: when a hash of the slice and the nonce matches the integrity value; when a decrypted signature of the integrity value matches a hash of the slice and the nonce; or when the decrypted signature of the integrity value matches the slice and the nonce; and when the integrity value is verified, updating a slice assignment corresponding to the slice, wherein updating the slice assignment associates the destination storage unit with the slice and disassociates the source storage unit from the slice.

20 Claims, 6 Drawing Sheets

Related U.S. Application Data continuation of application No. 16/411,424, filed on May 14, 2019, now Pat. No. 11,232,093, which is a continuation of application No. 15/225,476, filed on Aug. 1, 2016, now Pat. No. 10,402,393, which is a continuation-in-part of application No. 13/775,491, filed on Feb. 25, 2013, now Pat. No. 10,089,344.

(60) Provisional application No. 61/605,856, filed on Mar. 2, 2012.

(51) Int. Cl.

| | | |
|---|---|---|
| *G06F 11/10* | (2006.01) | |
| *G06F 16/11* | (2019.01) | |
| *G06F 16/13* | (2019.01) | |
| *G06F 16/182* | (2019.01) | |
| *G06F 16/21* | (2019.01) | |
| *G06F 16/22* | (2019.01) | |
| *G06F 16/23* | (2019.01) | |
| *G06F 16/901* | (2019.01) | |
| *H04L 9/06* | (2006.01) | |
| *H04L 9/32* | (2006.01) | |

(52) U.S. Cl.
CPC .......... *G06F 3/0647* (2013.01); *G06F 3/0679* (2013.01); *G06F 11/1076* (2013.01); *G06F 11/1084* (2013.01); *G06F 16/119* (2019.01); *G06F 16/137* (2019.01); *G06F 16/1844* (2019.01); *G06F 16/214* (2019.01); *G06F 16/2255* (2019.01); *G06F 16/235* (2019.01); *G06F 16/9027* (2019.01); *H04L 9/0643* (2013.01); *H04L 9/3236* (2013.01)

(58) Field of Classification Search
CPC .. G06F 16/214; G06F 16/235; G06F 16/9027; G06F 3/06; G06F 3/0619; G06F 3/0647; G06F 3/0679; G06F 11/1076; G06F 11/1084; H04L 9/0643; H04L 9/3236
See application file for complete search history.

(56) References Cited

U.S. PATENT DOCUMENTS

| | | | |
|---|---|---|---|
| 5,485,474 A | 1/1996 | Rabin | |
| 5,643,086 A | 7/1997 | Alcorn | |
| 5,757,915 A | 5/1998 | Aucsmith | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,052,797 A | 4/2000 | Ofek | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Nikolaevich | |
| 6,370,250 B1 | 4/2002 | Stein | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,490,666 B1 | 12/2002 | Cabrera | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,697,794 B1 | 2/2004 | Milby | |
| 6,704,868 B1 | 3/2004 | Challener | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 6,959,384 B1 | 10/2005 | Serret-Avila | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,076,062 B1 | 7/2006 | Spies | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,165,095 B2 | 1/2007 | Sim | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,340,602 B2 | 3/2008 | Serret-Avila | |
| 7,443,321 B1 | 10/2008 | Kaufman | |
| 7,454,592 B1* | 11/2008 | Shah | G06F 11/1453 711/216 |
| 7,634,657 B1 | 12/2009 | Stringham | |
| 7,636,724 B2 | 12/2009 | de la Torre | |
| 7,647,329 B1 | 1/2010 | Fischman | |
| 7,707,427 B1 | 4/2010 | Kenrich | |
| 7,818,535 B1 | 10/2010 | Bono et al. | |
| 7,979,441 B2 | 7/2011 | Sim-Tang | |
| 8,005,227 B1 | 8/2011 | Linnell | |
| 8,099,569 B2* | 1/2012 | Sugiura | G06F 3/067 711/161 |
| 8,122,213 B2* | 2/2012 | Cherian | G06F 3/067 711/170 |
| 9,009,474 B2* | 4/2015 | Stefan | H04L 63/123 713/160 |
| 9,177,153 B1* | 11/2015 | Perrig | G06F 21/57 |
| 2002/0062422 A1 | 5/2002 | Butterworth | |
| 2002/0141582 A1* | 10/2002 | Kocher | H04N 21/44236 380/201 |
| 2002/0147727 A1 | 10/2002 | Schreiber | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0063134 A1 | 4/2003 | Lord | |
| 2003/0065617 A1 | 4/2003 | Watkins | |
| 2003/0084020 A1 | 5/2003 | Shu | |
| 2003/0187847 A1 | 10/2003 | Lubbers | |
| 2003/0229627 A1 | 12/2003 | Carlson | |
| 2004/0015747 A1* | 1/2004 | Dwyer | G06F 11/3644 714/47.1 |
| 2004/0024963 A1 | 2/2004 | Talagala | |
| 2004/0122917 A1 | 6/2004 | Menon | |
| 2004/0153642 A1 | 8/2004 | Plotkin | |
| 2004/0215998 A1 | 10/2004 | Buxton | |
| 2004/0228493 A1 | 11/2004 | Ma | |
| 2004/0249993 A1 | 12/2004 | Hori | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0132196 A1 | 6/2005 | Dietl | |
| 2005/0144382 A1 | 6/2005 | Schmisseur | |
| 2005/0229069 A1 | 10/2005 | Hassner | |
| 2006/0016879 A1 | 1/2006 | Kean | |
| 2006/0047907 A1 | 3/2006 | Shiga | |
| 2006/0069798 A1 | 3/2006 | Li | |
| 2006/0112222 A1 | 5/2006 | Barrall | |
| 2006/0130154 A1 | 6/2006 | Lam et al. | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |

(56) References Cited

U.S. PATENT DOCUMENTS

| | | |
|---|---|---|
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0208760 A1 | 9/2007 | Reuter |
| 2007/0214285 A1 | 9/2007 | Au |
| 2007/0234110 A1 | 10/2007 | Soran |
| 2007/0250302 A1 | 10/2007 | Xu |
| 2007/0283167 A1 | 12/2007 | Venters, III |
| 2008/0126805 A1 | 5/2008 | Owlett |
| 2008/0295180 A1 | 11/2008 | Yoneda |
| 2009/0083563 A1 | 3/2009 | Murase |
| 2009/0094251 A1 | 4/2009 | Gladwin |
| 2009/0094318 A1 | 4/2009 | Gladwin |
| 2009/0307422 A1* | 12/2009 | Galloway ............... G06F 3/065 711/E12.001 |
| 2009/0319834 A1 | 12/2009 | Ogihara et al. |
| 2010/0023480 A1 | 1/2010 | Ito |
| 2010/0023524 A1 | 1/2010 | Gladwin |
| 2010/0023621 A1 | 1/2010 | Ezolt |
| 2010/0070698 A1 | 3/2010 | Ungureanu |
| 2010/0083003 A1 | 4/2010 | Spackman |
| 2010/0098256 A1 | 4/2010 | Kirshenbaum |
| 2010/0281013 A1 | 11/2010 | Graefe |
| 2011/0055903 A1 | 3/2011 | Leggette |
| 2011/0167004 A1* | 7/2011 | Zank ....................... G06F 21/64 705/64 |
| 2011/0202776 A1 | 8/2011 | Chen |
| 2011/0246433 A1 | 10/2011 | Sun |
| 2011/0264717 A1 | 10/2011 | Grube et al. |
| 2012/0030371 A1 | 2/2012 | Baptist et al. |
| 2012/0084333 A1 | 4/2012 | Huang |
| 2012/0226772 A1 | 9/2012 | Grube et al. |
| 2014/0074789 A1* | 3/2014 | Dutch ................. G06F 11/1469 707/640 |

FOREIGN PATENT DOCUMENTS

| | | |
|---|---|---|
| WO | WO2003032553 A2 * | 4/2003 |
| WO | 2009067139 | 5/2009 |
| WO | 2009110630 | 9/2009 |
| WO | WO2011084854 A1 * | 7/2011 |
| WO | WO2011148123 A1 | 12/2011 |
| WO | WO 2012021734 A1 * | 2/2012 |
| WO | 2012166723 | 12/2012 |

OTHER PUBLICATIONS

Fangyong Hou et al., "Efficient disk encryption and verification through trusted nonce", 2008 IEEE Symposium on Computers and Communications (2008, pp. 304-309).*

Chung; An Automatic Data Segmentation Method for 3D Measured Data Points; National Taiwan University; pp. 1-8; 1998.

Gong Zhang et al., "Automated lookahead data migration in SSD-enabled multi-tiered storage systems", IEEE 26th Symposium on Mass Storage Systems and Technologies (MSST)m May 2010, pp. 1-6.

Harrison; Lightweight Directory Access Protocol (LDAP): Authentication Methods and Security Mechanisms; IETF Network Working Group; RFC 4513; Jun. 2006; pp. 1-32.

International Searching Authority—US; International Search Report and Written Opinion; PCT/US13/28049; May 9, 2013; 6 pgs.

Kamel H. Rahouma, "Utilization of Multiple Block Cipher Hashing in Authentication and Digital Signatures", Proceedings IEEE International Conference on Networks 2000 (ICON 2000), Networking Trends and Challenges in the New Millennium., 2000, pp. 257-251.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (ISCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Su Yunling et al., "An Overview of Incremental Hash Function Based on Pair Block Chaining", International Forum on Information Technology and Applications, Jul. 16-18, 2010 , pp. 332-335.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

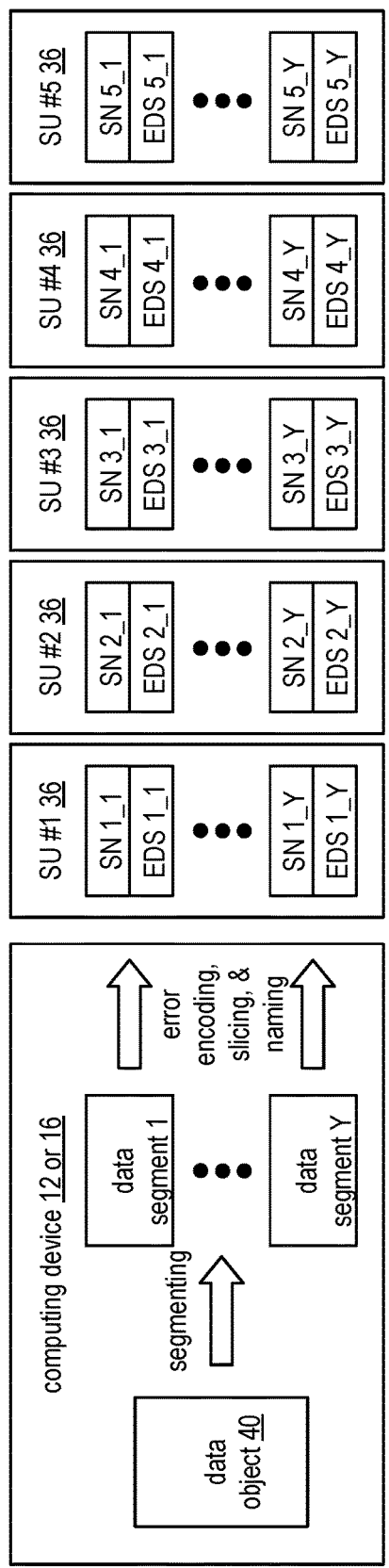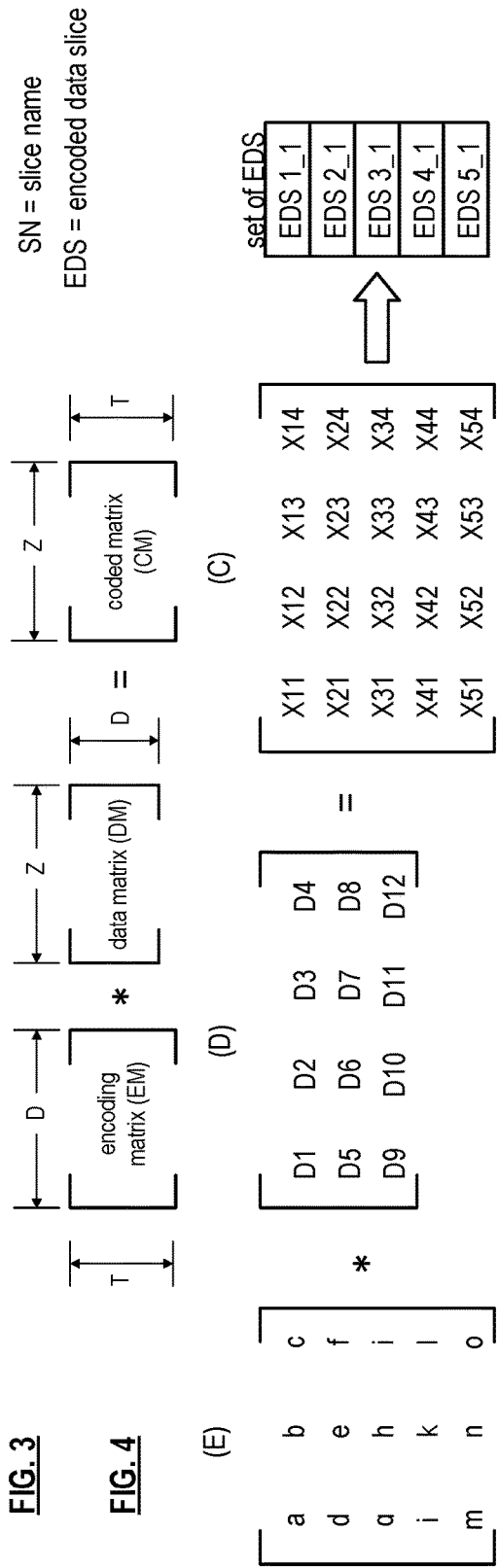

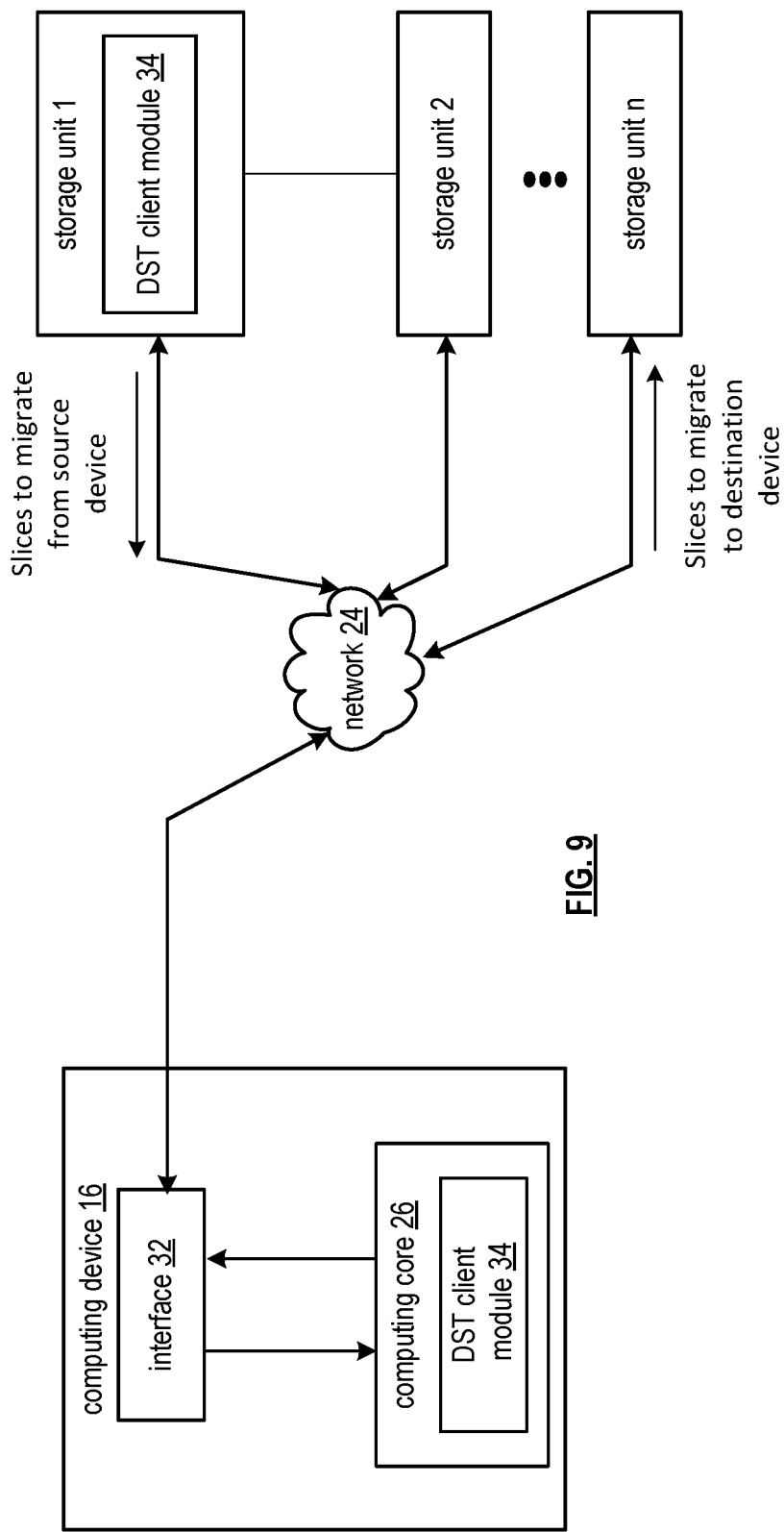

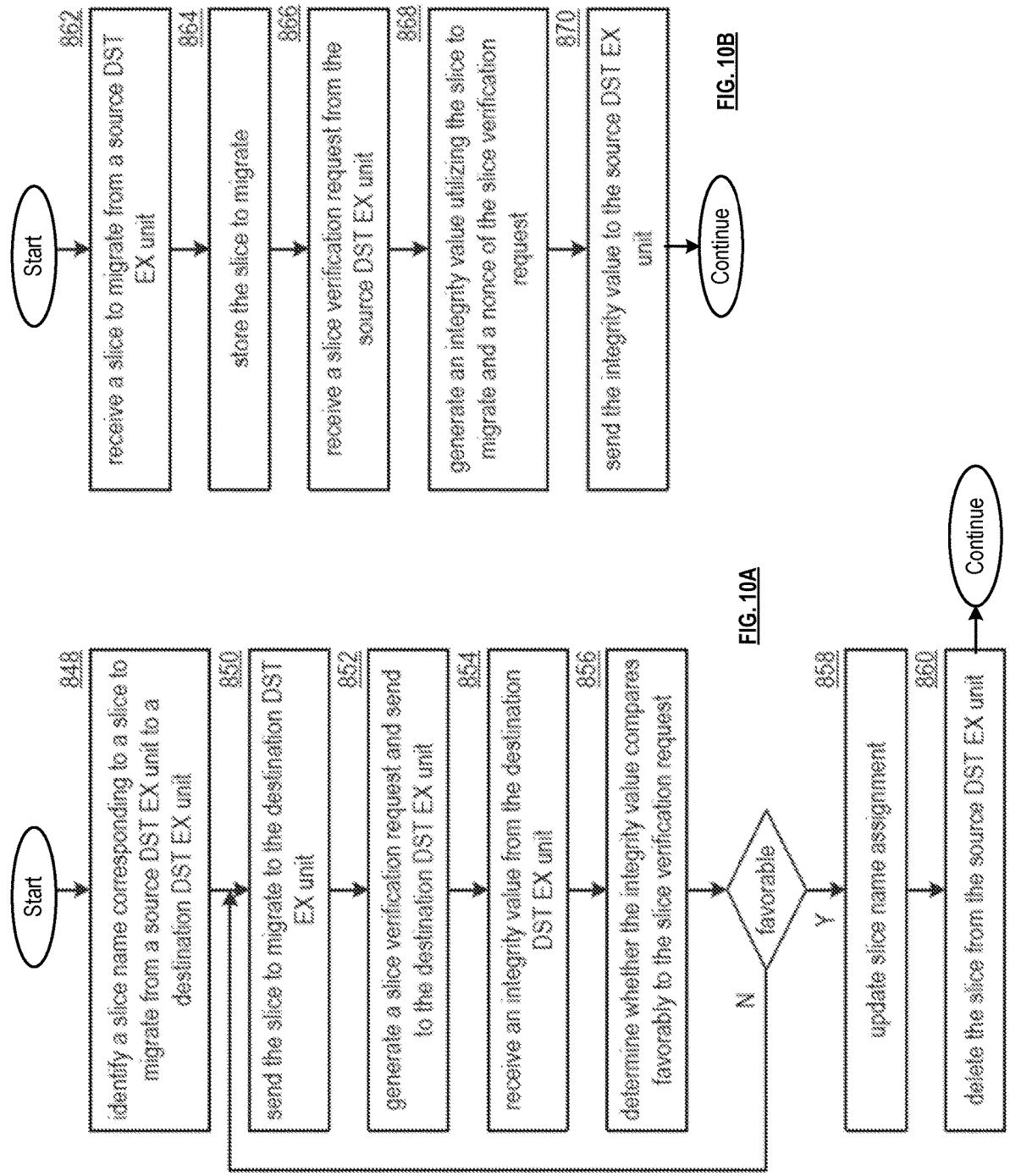

VERIFYING SLICE MIGRATION IN A STORAGE NETWORK

CROSS-REFERENCE TO RELATED APPLICATIONS

The present U.S. Utility Patent Application claims priority pursuant to 35 U.S.C. § 120 as a continuation of U.S. Utility application Ser. No. 17/644,277, entitled "MIGRATING SLICES IN A STORAGE NETWORK", filed Dec. 14, 2021, which is a continuation of U.S. Utility application Ser. No. 16/411,424, entitled "SLICE MIGRATION IN A DISPERSED STORAGE NETWORK", filed May 14, 2019, issued as U.S. Pat. No. 11,232,093 on Jan. 25, 2022, which is a continuation of U.S. Utility application Ser. No. 15/225,476, entitled "SLICE MIGRATION IN A DISPERSED STORAGE NETWORK", filed Aug. 1, 2016, issued as U.S. Pat. No. 10,402,393 on Sep. 3, 2019, which is a continuation-in-part of U.S. Utility application Ser. No. 13/775,491, entitled "LISTING DATA OBJECTS USING A HIERARCHICAL DISPERSED STORAGE INDEX", filed Feb. 25, 2013, issued as U.S. Pat. No. 10,089,344 on Oct. 2, 2018, which claims priority to U.S. Provisional Application No. 61/605,856, entitled "UTILIZING AN INDEX OF A DISTRIBUTED STORAGE AND TASK NETWORK" filed Mar. 2, 2012, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data.

Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWINGS

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9 is a schematic block diagram of an embodiment of a dispersed or distributed storage network (DSN) in accordance with the present invention;

FIG. 10A is a flowchart illustrating an example of migrating an encoded data slice in accordance with the present invention; and FIG. 10B is a flowchart illustrating an example of saving a migrated encoded data slice in accordance with the present invention.

DETAILED DESCRIPTION OF THE INVENTION

Figure 1:
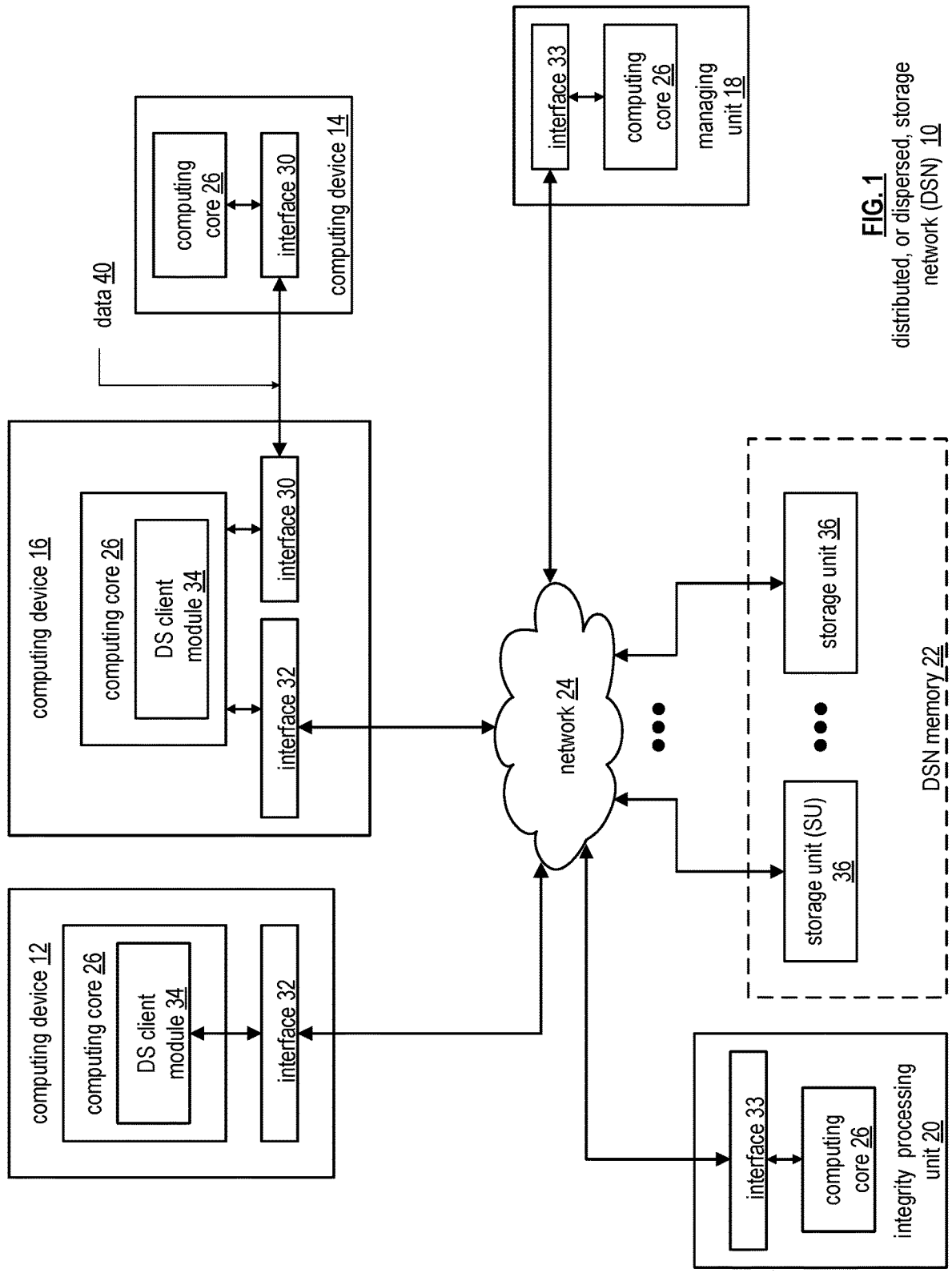
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
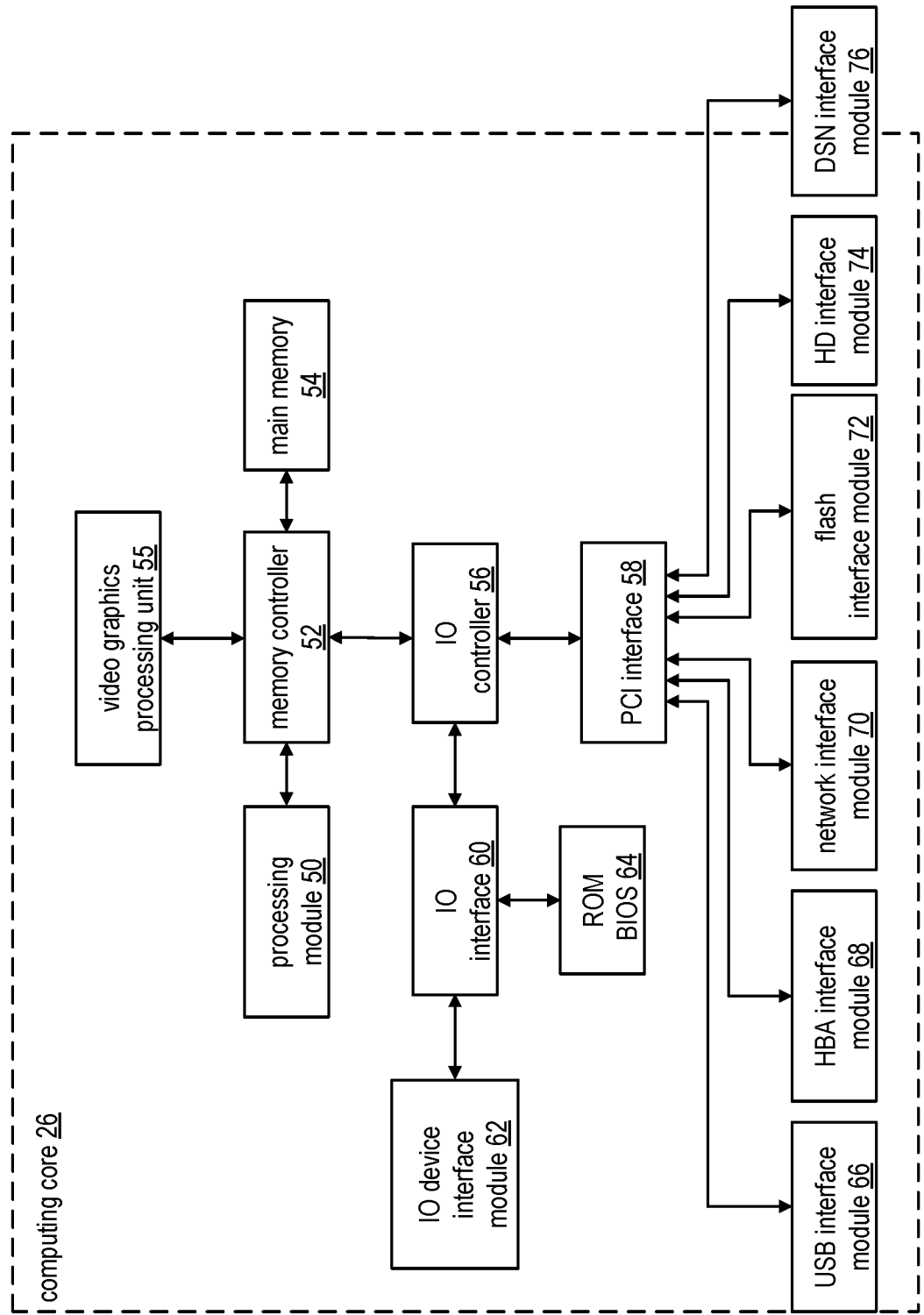
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a DST execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
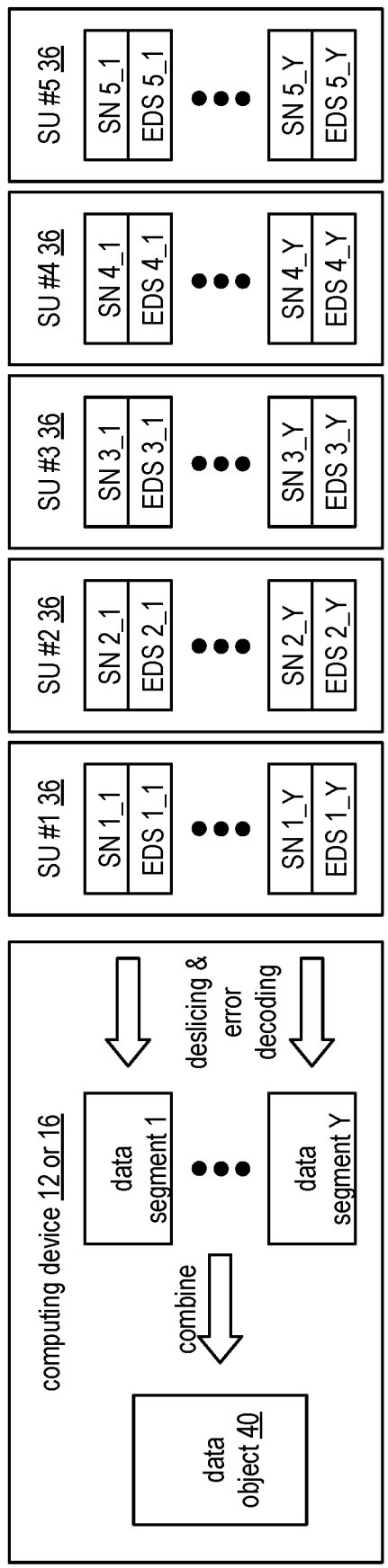
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9 is a schematic block diagram of another embodiment of a dispersed storage network (DSN) that includes a computing device 16 of FIG. 1, the network 24 of FIG. 1, and a plurality of storage units 1-n. Each computing device 16 can include the interface 32 of FIG. 1, the computing core 26 of FIG. 1, and the DS client module 34 of FIG. 1. The computing device 16 can function as a dispersed storage processing agent for computing device 14 as described previously, and may hereafter be referred to as a distributed storage and task (DST) processing unit. Each storage unit may be implemented utilizing the storage unit 36 of FIG. 1. The DSN functions to migrate encoded data slices from a source device to a destination device. In the example shown, the source device is storage unit 1 and the destination device is storage unit n.

In various embodiments, the source storage unit (e.g. storage unit 1) of a dispersed storage network includes a processor that performs the following: identifying a slice name corresponding to a slice to migrate from a source storage unit to a destination storage unit; sending the slice to migrate to the destination storage unit; generating a slice verification request and sending the slice verification request to the destination storage unit; receiving an integrity value from the destination storage unit; and determining when the integrity value compares favorably to the slice verification request. When the source storage unit determines that the integrity value compares favorably to the slice verification request, a slice name assignment associated with the slice name is updated and the slice is deleted from the source storage unit.

In various embodiments, identifying the slice name corresponding to the slice to migrate includes at least one of receiving a request, receiving the slice name, receiving an error message, detecting an unfavorable memory condition, performing a lookup, and receiving a memory test result. Sending the slice to migrate can include sending the slice name to the storage unit. The slice verification request can include one or more of: the slice name, the slice, a revision indicator, a verification method indicator, or a nonce.

In various embodiments, the integrity value includes at least one of: a hashing function hash result, or a signed package, wherein the package includes the slice and the nonce. Determining that the integrity value compares favorably to the slice verification request can be based on determining when a hash of the slice and nonce matches the integrity value and/or determining when a decrypted signature of the integrity value matches a hash of the slice and the nonce or the slice and the nonce. Updating the slice name assignment can associate the destination storage unit with the slice name and disassociate the source storage unit with the slice name in a distributed storage and task network (DSTN) address table. Deleting the slice from the source storage unit can include sending a write slice request to the source storage unit, where the request includes the slice name and an indication to delete the slice.

In various embodiments, the destination storage unit (e.g. storage unit n) of a dispersed storage network includes a processor that performs the following: receiving a slice to migrate from a source storage unit; storing the slice to migrate in a memory device associated with the destination storage unit; receiving a slice verification request from the source DST execution unit; generating an integrity value utilizing the slice to migrate and a nonce of the slice verification request based on a verification method indicator of the request; and sending the integrity value to the source DST execution unit.

In various embodiments, storing the slice includes storing a slice name associated with the slice in the memory device. The slice verification request can include one or more of: the slice name, the slice, a revision indicator, the verification method indicator, or a nonce. Generating the integrity value can include performing a hashing function on the slice and the nonce to produce a hash result as the integrity value when the verification method indicator indicates to produce a hash result or generating a signature utilizing a private key associated with the destination storage unit over the slice and the nonce to produce a signed package as the integrity value when the verification method indicator indicates to produce a signature.

FIG. 10A is a flowchart illustrating an example of migrating an encoded data slice. In particular, a method is presented for use in conjunction with one or more functions and features described in association with FIGS. 1-9. For example, the method can be executed by a source DST execution unit or other storage unit that includes a processor or via another processing system of a dispersed storage network that includes at least one processor and memory that stores instruction that configure the processor or processors to perform the steps described below. Step 848 includes identifying a slice name corresponding to a slice to migrate from the source DST execution unit to a destination DST execution unit. The identifying can include at least one of: receiving a request, receiving the slice name, receiving an error message, detecting an unfavorable memory condition (e.g., too full), performing a lookup, or receiving a memory test result.

Step 850 includes sending the slice to migrate to the destination DST execution unit. The sending can include sending the slice name to the DST execution unit. Step 852 includes generating a slice verification request and sending the slice verification request to the destination DST execution unit. The generating can include generating the request to include one or more of: the slice name, the slice, a revision indicator, a verification method indicator (e.g., utilize a hashing function, utilize a signature function), or a nonce.

Step 854 includes receiving an integrity value from the destination DST execution unit. The integrity value can include at least one of: a hashing function hash result (e.g., a hash over the slice and the nonce) and a signed package, wherein the package includes the slice and the nonce. Step 856 includes determining whether the integrity value compares favorably to the slice verification request. For example, in circumstances when the integrity value includes a hash result, the processing system can determine that the integrity value compares favorably to the slice verification request when a hash of the slice and nonce is substantially the same as the integrity value. As another example when the integrity value includes a signed package, the processing system can determine that the integrity value compares favorably to the slice verification request when a decrypted signature (e.g., utilizing a public key of the destination DST execution unit) of the integrity value is substantially the same as at least one of a hash of the slice and the nonce or the slice and the nonce. The method repeats back to step 850 when the processing system determines that the integrity value compares unfavorably to the slice verification request.

The method continues to step 858 when the processing system determines that the integrity value compares favorably to the slice verification request. Step 858 includes updating a slice name assignment with regards to the slice name. For example, the processing system can associate the destination DST execution unit with the slice name and disassociate the source DST execution unit with the slice name in a physical location via a distributed storage and task network (DSTN) address table. Step 860 includes deleting the slice from the source DST execution unit. For example, the processing system can send a write slice request to the source DST execution unit, where the request includes the slice name and an indication to delete the slice.

FIG. 10B is a flowchart illustrating an example of saving a migrated encoded data slice. In particular, a method is presented for use in conjunction with one or more functions and features described in association with FIGS. 1-9 and 10A. For example, the method can be executed by a destination DST execution unit or other storage unit that includes a processor or via another processing system of a dispersed storage network that includes at least one processor and memory that stores instruction that configure the processor or processors to perform the steps described below. Step 862 includes receiving a slice to migrate from a source DST execution unit. Step 864 includes storing the slice to migrate in a memory device associated with the destination DST execution unit. The storing includes storing a slice name associated with the slice to migrate in the memory device. Step 866 includes receiving a slice verification request from the source DST execution unit.

Step 868 includes generating an integrity value utilizing the slice to migrate and a nonce of the slice verification request based on a verification method indicator of the request. For example, the processing system performs a hashing function on the slice and the nonce to produce a hash result as integrity value when the verification method indicator indicates to produce a hash result. As another example, the processing system generates a signature utilizing a private key associated with the destination DST execution unit over the slice and the nonce to produce a signed package as the integrity value when the verification method indicator indicates to produce a signature. Step 870 includes sending the integrity value to the source DST execution unit.

In various embodiments, a non-transitory computer readable storage medium includes at least one memory section that stores operational instructions that, when executed by a processing system of a dispersed storage network (DSN) that includes a processor and a memory, causes the processing system to form the functions described above in conjunction with the source storage unit and/or the destination storage unit.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a a storage network that includes a processor, the method comprises:
   facilitating migration of a slice from a source storage unit of the storage network located in a first location to a destination storage unit of the storage network located in a second location;
   storing, via the destination storage unit, the slice in memory of the destination storage unit based on migration of the slice from the source storage unit to the destination storage unit;
   sending, via the source storage unit, a slice verification request to the destination storage unit, wherein the slice verification request corresponds to a migration of the slice from the source storage unit to the destination storage unit, wherein the slice verification request includes a nonce and one or more of: a slice identifier, the slice, a revision indicator, or a verification method indicator;
   sending, via the destination storage unit, an integrity value to the source storage unit based on the slice verification request;
   receiving, via the source storage unit, the integrity value from the destination storage unit;
   determining, via the source storage unit, when the integrity value is verified by determining one of:
      when a hash of the slice and the nonce matches the integrity value;
      when a decrypted signature of the integrity value matches a hash of the slice and the nonce; or when the decrypted signature of the integrity value matches the slice and the nonce; and when the integrity value is verified, updating, via the source storage unit, a slice assignment corresponding to the slice, wherein updating the slice assignment associates the destination storage unit with the slice and disassociates the source storage unit from the slice.

2. The method of claim 1, wherein the slice to migrate is identified based on receiving a request.

3. The method of claim 1, wherein the slice to migrate is identified based on receiving an error message.

4. The method of claim 1, wherein the slice to migrate is identified based on detecting an unfavorable memory condition.

5. The method of claim 1, wherein the slice to migrate is identified based on performing a lookup.

6. The method of claim 1, wherein the slice to migrate is identified based on receiving a memory test result.

7. The method of claim 1, wherein sending the slice to migrate includes sending a slice identifier to the destination storage unit.

8. The method of claim 1, wherein the integrity value includes at least one of: a hashing function hash result, or a signed package, wherein the signed package includes the slice and the nonce.

9. The method of claim 1, further comprising:
deleting the slice from the source storage unit.

10. The method of claim 9, wherein deleting the slice from the source storage unit is based on the slice identifier.

11. A storage network comprises:
a source storage unit located in a first location comprising:
at least one first processor; and
at least one first memory section that stores first operational instructions; and
a destination storage unit located in a second location comprising:
at least one second processor; and
at least one second memory section that stores second operational instructions that, when executed by the at least one second processor, cause a second processing system of the destination storage unit to:
store a slice in memory of the destination storage unit based on migration of the slice from the source storage unit to the destination storage unit;
wherein the first operational instructions, when executed by the at least one first processor, cause a first processing system of the source storage unit to:
send a slice verification request to the destination storage unit, wherein the slice verification request corresponds to a migration of the slice from the source storage unit to the destination storage unit, wherein the slice verification request includes a nonce and one or more of: a slice identifier, the slice, a revision indicator, or a verification method indicator;

wherein the second operational instructions, when executed by the at least one second processor, further cause the second processing system of the destination storage unit to:

send an integrity value to the source storage unit based on the slice verification request;

wherein the first operational instructions, when executed by the at least one first processor, further cause the first processing system of the source storage unit to:
receive the integrity value from the destination storage unit;
determine when the integrity value is verified by determining one of:
when a hash of the slice and the nonce matches the integrity value;
when a decrypted signature of the integrity value matches a hash of the slice and the nonce; or
when the decrypted signature of the integrity value matches the slice and the nonce; and
when the integrity value is verified, updating a slice assignment corresponding to the slice, wherein updating the slice assignment associates the destination storage unit with the slice and disassociates the source storage unit from the slice.

12. The storage network of claim 11, wherein the slice to migrate is identified based on receiving a request.

13. The storage network of claim 11, wherein the slice to migrate is identified based on receiving an error message.

14. The storage network of claim 11, wherein the slice to migrate is identified based on detecting an unfavorable memory condition.

15. The storage network of claim 11, wherein the slice to migrate is identified based on performing a lookup.

16. The storage network of claim 11, wherein the slice to migrate is identified based on receiving a memory test result.

17. The storage network of claim 11, wherein sending the slice to migrate includes sending a slice identifier to the destination storage unit.

18. The storage network of claim 11, wherein the integrity value includes at least one of: a hashing function hash result, or a signed package, wherein the signed package includes the slice and the nonce.

19. The storage network of claim 11, further comprising:
deleting the slice from the source storage unit.

20. The storage network of claim 19, wherein deleting the slice from the source storage unit is based on the slice identifier.

* * * * *